United States Patent [19]

Hara

[11] Patent Number: 5,111,458
[45] Date of Patent: May 5, 1992

[54] HARDWARE ARRANGEMENT FOR STORING ERROR INFORMATION IN PIPELINED DATA PROCESSING SYSTEM AND METHOD THEREFOR

[75] Inventor: Tadashi Hara, Tokyo, Japan

[73] Assignee: NEC Corporation, Tokyo, Japan

[21] Appl. No.: 385,192

[22] Filed: Jul. 26, 1989

[30] Foreign Application Priority Data

Jul. 27, 1988 [JP] Japan .................... 63-185417

[51] Int. Cl.[5] ............................... G06F 11/10
[52] U.S. Cl. .................... 371/16.5; 371/49.1; 371/51.1
[58] Field of Search ............... 371/16.1, 15.1, 16.5, 371/49.1, 51.1

[56] References Cited

U.S. PATENT DOCUMENTS

| | | | |
|---|---|---|---|
| 4,414,669 | 11/1983 | Heckelman et al. | 371/49.1 |
| 4,660,198 | 4/1987 | Lyon | 371/22.5 |
| 4,745,605 | 5/1988 | Goldman et al. | 371/49.2 |

Primary Examiner—Charles E. Atkinson
Attorney, Agent, or Firm—Foley & Lardner

[57] ABSTRACT

In order to simplify a hardware arrangement for obtaining error information in a pipelined data processing system which includes serially coupled stages, two separate (first and second) error signal storage means are provided. The first error signal storage means has a plurality of one-bit (for example) memory cells which are respectively assigned to the pipeline stages. The first error signal storage means defines one pipeline stage in which an error is initially detected. The second error signal storage means responds to an error detection signal and receives error analyzing information from the last stage of the pipeline.

5 Claims, 2 Drawing Sheets

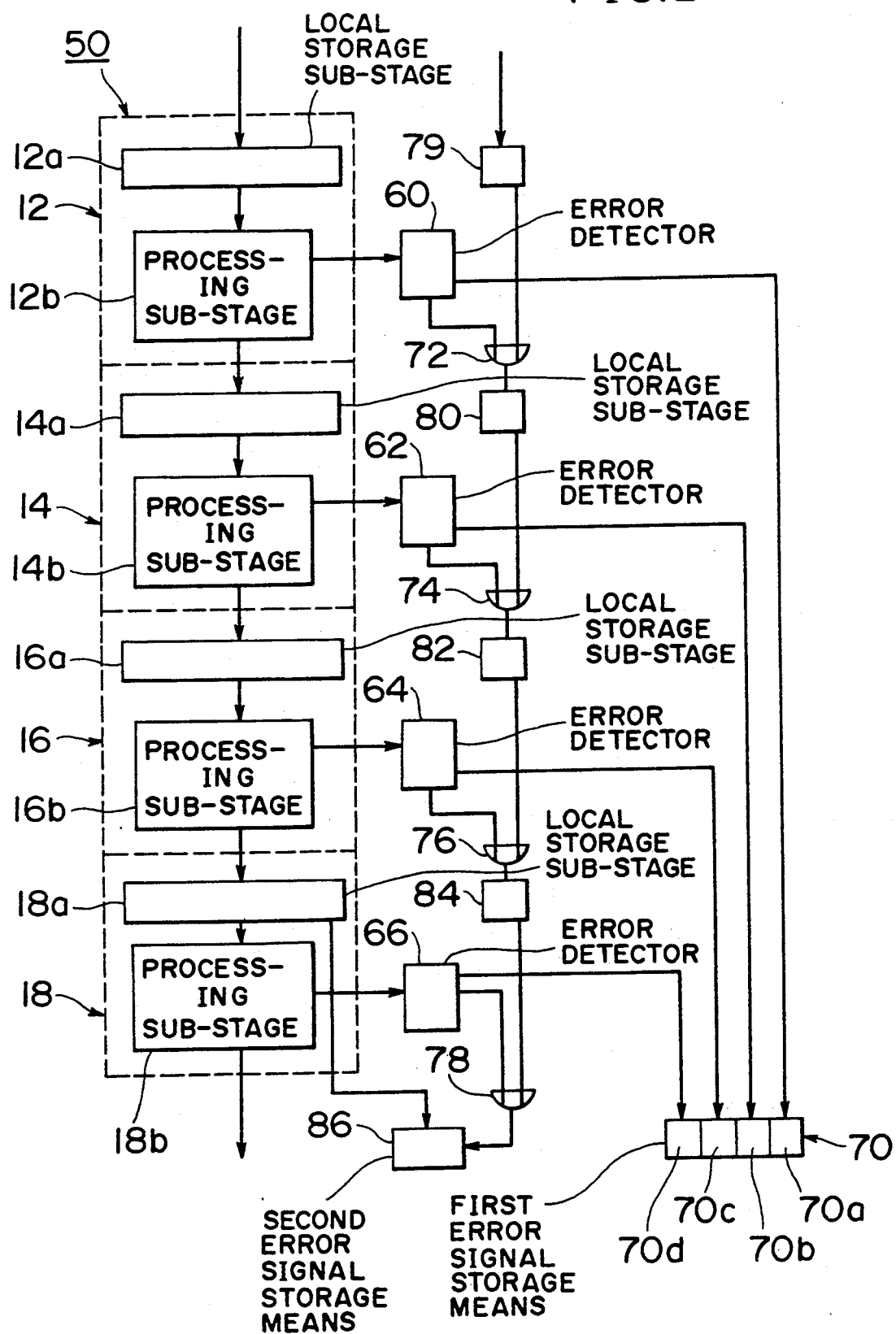

HARDWARE ARRANGEMENT FOR STORING ERROR INFORMATION IN PIPELINED DATA PROCESSING SYSTEM AND METHOD THEREFOR

BACKGROUND OF THE INVENTION

1. Field of the Invention

This invention relates generally to a hardware arrangement for detecting error and storing information thereof in a pipelined data processing system and a method therefor, and more specifically to such an arrangement and method which enable a simplification in the hardware configuration.

2. Description of the Prior Art

Pipelining is a hardware technique for achieving higher performance by breaking a complex, time-consuming function into a series of simpler, shorter operations, each of which can then be executed in assembly-line fashion with simultaneous computation on different sets of data.

It is a common practice in a pipelined data processing system to check for a malfunction in each of the processing sub-stages of a pipeline. However, a conventional hardware arrangement for detecting error and storing information thereof in a pipelined data processing system, has encountered the problem that it is rather complex and hence not suitable for large scale circuit integration by way of example.

Before describing in detail the present invention an arrangement known to the present applicant will be described with reference to FIG. 1. It should be noted that a control network for the FIG. 1 arrangement is not shown for simplifying the description of the drawing and facilitating the description of the arrangement.

As shown in FIG. 1, a pipeline 10 includes four serially coupled stages 12, 14, 16 and 18, which perform, merely by way of example, instruction fetch, instruction decode, address generation, and operand fetch, respectively. Each of the stages 12, 14, 16 and 18 includes a local storage sub-stage (12a, 14a, 16a or 18a) followed by a data or instruction processing substage (12b, 14b, 16b or 18b). Each of the data processing sub-stages 12b through 18b manipulates data which is derived from the preceding local storage substage (12a, 14a, 16a or 18a).

The data processing sub-stages 12b, 14b, 16b and 18b are respectively coupled to error detectors 30, 32, 34 and 36, each of which is provided for detecting malfunction in the associated data processing sub-stage (12b, 14b, 16b or 18b).

It is assumed that the error detector 32 detects a malfunction in the associated data processing sub-stage 14b. Upon detection of the malfunction in the sub-stage 14b, the detector 32 applies a first error signal through an OR gate 38 to an error information storage means 40 which comprises memory sections 40a, 40b, 40c and 40d. The first error signal merely represents an error occurrence. Within the same operation cycle as the error detector 32 detects the malfunction in the substage 14b, a second error signal, containing error information for analyzing the detected error, is derived from the local storage sub-stage 14a and is stored in the memory section 40b of the error signal storage means 40.

Since the information storage means 40 stores both of the first and second error signals, it is necessary to save the error information within the same cycle as the error occurs to prevent it being erased at the next clock interval. Therefore, the error information storage means 40 is provided with the four memory sections 40a, 40b, 40c and 40d in this particular instance. Inasmuch as each of the memory sections 40a, 40b, 40c and 40d requires a large amount of memory (for example 32 or 64 bits) for storing the error information, it is highly desirable to limit the number of the memory sections.

SUMMARY OF THE INVENTION

It is an object of this invention to provide a hardware arrangement for storing error information in a pipelined data processing system, which arrangement is characterized by a simple hardware configuration.

It is another object of this invention to provide a method of storing error information in a pipelined data processing system, which method is characterized by a simple hardware configuration.

One aspect of this invention takes the form of a hardware arrangement for obtaining error information in a pipelined data processing system in which two separate (first and second) error signal storage means are provided. The first error signal storage means has a plurality of one-bit (for example) memory cells which are respectively assigned to the pipeline stages. The first error signal storage means defines one pipeline stage in which an error is initially detected. The second error signal storage means responds to an error detection signal and receives error analyzing information from the last stage of the pipeline.

Another aspect of this invention takes the form of a hardware arrangement for obtaining error information in a pipelined data processing system, the pipelined data processing system including a plurality of serially coupled pipeline stages, each of the stages including a local storage sub-stage and a data processing sub-stage, the hardware arrangement comprising: a plurality of error detectors, the error detectors each being coupled to one of the data processing sub-stages, the error detectors generating first and second error signals in response to detection of error in the associated data processing sub-stage; first error signal storage means, the first error signal storage means being coupled to each of the plurality of error detectors and having a plurality of memory sections, each of the memory sections being assigned to one of the error detectors, each of the memory sections being arranged to store the first error signal applied from the associated error detector; and second error signal storage means, the second error signal storage means being coupled to the last one of the serially coupled pipeline stages for storing error information therefrom in response to the second error signal.

Still another aspect of this invention takes the form of a hardware arrangement for obtaining error information in a pipelined data processing system which includes a plurality of serially coupled pipeline stages, the serially coupled pipelined stages cyclically transferring data from one stage to the next in accordance with a predetermined timing, each of the stages including a local storage sub-stage and a data processing sub-stage, the hardware arrangement comprising: means for generating first and second error signals in response to the detection of an error in a data processing sub-stage; first error signal storage means for directly receiving the first error signal and storing the first signal therein; second error signal storage means coupled to the last of the stages; and a plurality of circuit groups for stepwisely transferring the second error signal toward the second error signal storage means in accordance with the predetermined timing, each of the circuit groups being associated with one of the stages; wherein the second error signal storage means stores data pertaining to the error, which produced the first and second error signals, from the last of the stages in response to the second error signal being relayed from the circuit groups.

Still another aspect of this invention takes the form of a method of obtaining error information in a pipelined data processing system which includes a plurality of serially coupled pipeline stages, each of the stages including a local storage sub-stage and a data processing sub-stage, comprising the steps of: cyclically transferring data from one stage to the next in accordance with a predetermined timing; generating first and second error signals in response to the detection of an error in a data processing sub-stage; supplying the first error signal directly to a first error signal storage means and storing the first signal therein; stepwisely transferring the second error signal toward a second error signal storage means via a plurality of circuit groups and in accordance with the predetermined timing, each of the circuit groups being associated with one of the stages; sequentially shifting data pertaining to the error which produced the first and second error signals, from the stage in which error occurs to the subsequent stages in accordance with the predetermined timing; and supplying the data pertaining to the error from the last of the stages to the second error signal storage means in response to the second error signal being relayed from the circuit group associated with the last stage to the second error signal storage means.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 2 is a block diagram showing a pipelined data processing system which includes an improved error information saving arrangement according to the present invention.

DETAILED DESCRIPTION OF THE PREFERRED EMBODIMENTS

Figure 1:
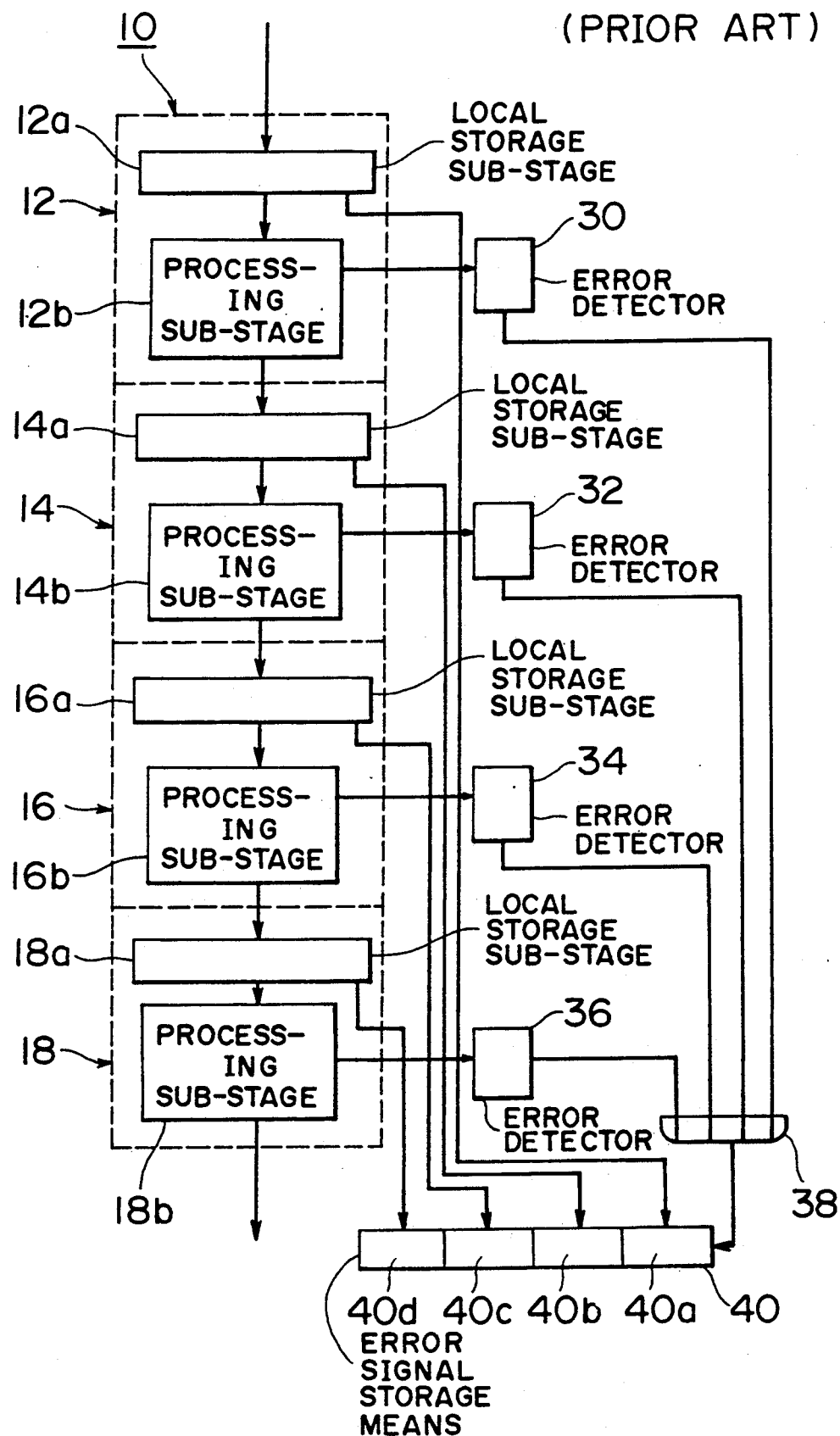
FIG. 1 is a block diagram showing a pipelined data processing system which includes a known error information saving arrangement.

A preferred embodiment of this invention is schematically illustrated in FIG. 2. A data pipeline 50 of FIG. 2 may be identical with the data pipeline 10 in FIG. 1 and hence further description thereof will be omitted for simplicity. A control network for the FIG. 2 arrangement is not shown for simplifying the description of the drawing and facilitating the description of the arrangement.

Four error detectors 60, 62, 64 and 66 have their inputs coupled to the data processing sub-stages 12b, 14b, 16b and 18b, respectively, and have their first outputs coupled to first error signal storage means 70. Each of the error detectors 60, 62, 64 and 66 generates a first error signal at the first output thereof upon detecting an error in the associated data processing substage. The storage means 70 includes, in this embodiment, four memory sections 70a, 70b, 70c and 70d each of which stores the first error signal applied from the associated data processing sub-stage. Since the first error signal indicates merely an existence of an error, each of the memory sections 70a, 70b, 70c and 70d is able to store the first error signal so long as it has one-bit memory capacity available for said purpose.

An OR gate 72 is coupled to the second output of the error detector 60 and receives a second error signal therefrom when the error detector 60 detects a malfunction in the sub-stage 12b. The second error signal represents merely error detection in the sub-stage 12b and hence is a one-bit signal. The OR gate 72 applies the output thereof to the following stage, viz., a register 80. Similarly, an OR gate 74 is coupled to the second output of the error detector 62 and receives a second error signal therefrom when the error detector 62 detects malfunction in the sub-stage 14b. The OR gate 74 applies the output thereof to a register 82. An OR gate 76 is coupled to the second output of the error detector 64 and receives a second error signal therefrom when the error detector 64 detects a malfunction in the sub-stage 16b. The OR gate 76 applies the output thereof to a register 84. Finally, an OR gate 78 is coupled to the second output of the error detector 66 and receives a second error signal therefrom when the error detector 66 detects a malfunction in the sub-stage 18b. The OR gate 78 applies the output thereof to a second error signal storage means 86. The storage means 86 is provided with memory capacity of 32 or 64 bits (for example), which corresponds to one memory section of the storage means 40 shown in FIG. 1. The storage means 86 stores the error information held in the local storage sub-stage 18a in response to the second error signal applied via the OR gate 78. The operation of storing the error information will be discussed in detail hereinafter.

Let it be assumed for the sake of explanation that the error detector 62 detects a malfunction in the data processing sub-stage 14b within a given clock cycle (T0). Upon the malfunction being detected in the sub-stage 14b, the detector 62 applies the first error signal (a logic "1" or "0") directly to the memory cell 70b within the next clock cycle (T0+1). The first error signal merely represents an error occurrence at the sub-stage 14b. It is understood that one-bit memory capacity of each memory cell (70a, 70b, 70c or 70d) of the storage means 70 is sufficient to store the first error signal. In order to specify the processing sub-stage wherein an error is detected, once a memory cell of the storage means 70 stores an error signal, writing into the memory cell is inhibited until the content thereof is read out.

The data which includes the error detected by the detector 62, is applied from the processing sub-stage 14b to the local storage sub-stage 16a within the clock cycle (T0+1) and then to the local storage sub-stage 18a within the clock cycle (T0+2). On the other hand, when the detector 62 detects an error, a logic "1" (for example) indicating that an error is detected is applied to the register 82 as the second error signal at the clock cycle (T0+1) and is stored therein. The second error signal is relayed to the register 84 at the clock cycle (T0+2), after which the second signal reaches the second error signal storage means 86 at the clock cycle (T0+3). The second error signal storage means 86, responding to the second error signal applied via the OR gate 78, stores the data within the local storage substage 18a at the clock cycle (T0+3). The data thus stored in the second error signal storage means 86 includes the error information necessary for analyzing the error detected by the detector 62.

The register 79 is provided for relaying a second error signal produced in an arrangement (not shown) preceding the FIG. 2 arrangement to the register 80. In the case where such a relay of the error signal is unnecessary, the register 79 may be omitted.

The first error signal storage means 70 specifies the data processing sub-stage wherein malfunction is initially detected, while the second error signal storage means 86 stores data containing error information for analyzing the detected error.

In the above description, the error data detected in the sub-stage 14b may cause the following sub-stages 16b and 18b to process data erroneously. As a result, each of the error detectors 64 and 66 generates a second signal which is stored in the first error signal storage means 70. However, the sub-stage 14b in which the error is initially detected, can be defined by the memory condition at the first error signal storage means 70.

It is understood that, in the aforesaid preferred embodiment, according to the present invention, the second error signal storage means 86 occupies only one-fourth of memory area compared with the storage means 40 shown in FIG. 1 for the same number of stages. Although the present invention is provided with the first error signal storage means 70 which is unnecessary with the prior art, the present invention permits an arrangement which is simpler than the prior art in that the storage means 70 comprises only 4 bits (for example).

While the foregoing description describes only one embodiment of the present invention, the various alternatives and modifications possible without departing from the scope of the present invention, which is limited only by the appended claims, will be apparent to those skilled in the art.

What is claimed is:

1. A hardware arrangement for obtaining error information in a pipelined data processing system, said pipelined data processing system including a plurality of serially coupled pipeline stages, each of said stages including a local storage sub-state and a data processing sub-stage, said hardware arrangement comprising:
   a plurality of error detectors, each of said error detectors being coupled to a respective one of said data processing sub-stages, each of said error detectors generating first and second error signals in response to detection of error in an associated data processing sub-stage;
   first error signal storage means, said first error signal storage means being coupled to each of said plurality of error detectors and having a plurality of memory sections, each of said memory sections being assigned to a respective one of said error detectors, each of said memory sections being arranged to store said first error signal applied from an associated error detector;
   second error signal storage means, said second error signal storage means being coupled to said local storage sub-stage included in a last pipeline stage of said serially coupled pipeline stages for storing error information therefrom in response to said second error signal;
   a first OR gate which is coupled between said second error signal storage means and an error detector assigned to said last pipeline stage of said serially coupled pipeline stages, said second error signal storage means being responsive to a second signal applied through said first OR gate; and
   a plurality of series circuits each consisting of a second OR gate and a register, each of said series circuits being assigned to one of said error detectors except for an error detector provided for said last pipeline stage of said serially coupled pipeline stages, said second OR gate receiving said second signal at one input thereof and receiving an output of a register preceded thereby at the other input thereof, an output of said second OR gate being stored in a register of the same series circuit, and said register applying an output thereof to an OR gate of a following series circuit.

2. A hardware arrangement as claimed in claim 1, wherein each of said memory sections of said first error signal storage means is a one-bit memory cell.

3. A hardware arrangement for obtaining error information in a pipelined data processing system which includes a plurality of serially coupled pipeline stages, said serially coupled pipelined stages cyclically transferring data from one stage to the next stage in accordance with a predetermined timing, each of said stages including a local storage sub-stage and a data processing sub-stage, said hardware arrangement comprising:
   a plurality of error detectors respectively coupled to said data processing sub-stages, each of said error detectors generating first and second error signals in response to detection of an error in a data processing sub-stage coupled thereto;
   first error signal storage means for directly receiving said first error signal and storing said first error signal therein;
   second error signal storage means coupled to a last of said pipeline stages; and
   a plurality of circuit groups each of which includes a register and an OR gate and which are respectively coupled to said error detectors, said circuit groups stepwisely transferring said second error signal toward said second error signal storage means in accordance with said predetermined timing;
   wherein said second error signal storage means stores data pertaining to said error, which produced said first and second error signals, from said local storage sub-stage of a last pipeline stage of said pipeline stages in response to said second error signal being relayed from said circuit groups.

4. A hardware arrangement as claimed in claim 5, wherein said first error signal storage means comprises a plurality of memory sections and each of said memory sections of said first error signal storage means is a one-bit memory cell.

5. A method of obtaining error information in a pipelined data processing system which includes a plurality of serially coupled pipeline stages, each of said stages including a local storage sub-stage and a data processing sub-stage, comprising the steps of:
   cyclically transferring data from one pipeline stage to a next pipeline stage in accordance with a predetermined timing;
   generating first and second error signals in response to detection of an error in a respective said data processing sub-stage in each of said pipeline stages;
   supplying said first error signal directly to a first error signal storage means and storing said first error signal therein;
   stepwisely transferring said second error signal toward a second error signal storage means via a plurality of circuit groups in accordance with said predetermined timing, each of said circuit groups being associated with one of said pipeline stages;

sequentially shifting data pertaining to said error which produced said first and second error signals, from a pipeline stage in which said error occurs to subsequent pipeline stages in accordance with said predetermined timing; and supplying said data pertaining to said error from a last stage of said pipeline stages to said second error signal storage means in response to said second error signal being related from a circuit group associated with said last stage to said second error signal storage means.

* * * * *